United States Patent
Des Courtis et al.

(10) Patent No.: US 10,549,409 B2
(45) Date of Patent: Feb. 4, 2020

(54) FAMILY OF TEMPORARY FASTENERS AND A DEVICE FOR INSTALLING THEM

(71) Applicant: LISI AEROSPACE, Paris (FR)

(72) Inventors: Vianney Des Courtis, Paris (FR); Alexis Gabillon, Villejuif (FR); Etienne Luneau, Segry (FR); Philippe Prot, Vignoux sur Barangeon (FR)

(73) Assignee: LISI AEROSPACE, Paris (FR)

( * ) Notice: Subject to any disclaimer, the term of this patent is extended or adjusted under 35 U.S.C. 154(b) by 904 days.

(21) Appl. No.: 13/900,427

(22) Filed: May 22, 2013

(65) Prior Publication Data

US 2013/0319180 A1 Dec. 5, 2013

(30) Foreign Application Priority Data

May 30, 2012 (FR) ..................................... 12 54964

(51) Int. Cl.
*B25B 21/00* (2006.01)
*B25B 31/00* (2006.01)
(Continued)

(52) U.S. Cl.
CPC .......... *B25B 21/002* (2013.01); *B25B 31/005* (2013.01); *B25B 21/00* (2013.01); *F16B 1/0071* (2013.01); *F16B 19/109* (2013.01)

(58) Field of Classification Search
CPC ..... B25B 21/002; B25B 31/005; B25B 21/00; F16B 1/0071; F16B 19/109
(Continued)

(56) References Cited

U.S. PATENT DOCUMENTS 569,896 A * 10/1896 Cauwenberg ......... B23B 49/005
   408/202
1,057,101 A * 3/1913 Wachter .............. B25B 23/0035
   30/164.9
(Continued)

FOREIGN PATENT DOCUMENTS

| EP | 0336808 B1 | 10/1989 |
| EP | 0466609 B1 | 7/1991 |
| GB | 2126146 A | 3/1984 |

OTHER PUBLICATIONS

Pothmann, Johannes, French Search Report, FR1254964, dated Jan. 23, 2013, 6 pages, Institut National de la Propriété Industrialle.
(Continued)

*Primary Examiner* — Monica S Carter
*Assistant Examiner* — Danny Hong
(74) *Attorney, Agent, or Firm* — Henricks Slavin LLP

(57) ABSTRACT

The invention concerns a family of insertable temporary fasteners (100) comprising the following:
  a body (101) with a bearing face (102)
  at least one clip (103) with a hooking spur (104)
  a threaded rod (105, 205) connected to the clip, with a control nut (107, 207) screwed onto the said rod
The family comprises at least two temporary fasteners (100) with different diameters and nuts with different lengths (116).
The invention also concerns a set comprising such a family of fasteners, along with an installation device (13) comprising a means (26, 30) of detecting the length of the nut.
The invention enables the installation device to automatically determine the appropriate tightening torque when installing the fastener based on the length of the nut.

10 Claims, 2 Drawing Sheets

Figure 1:
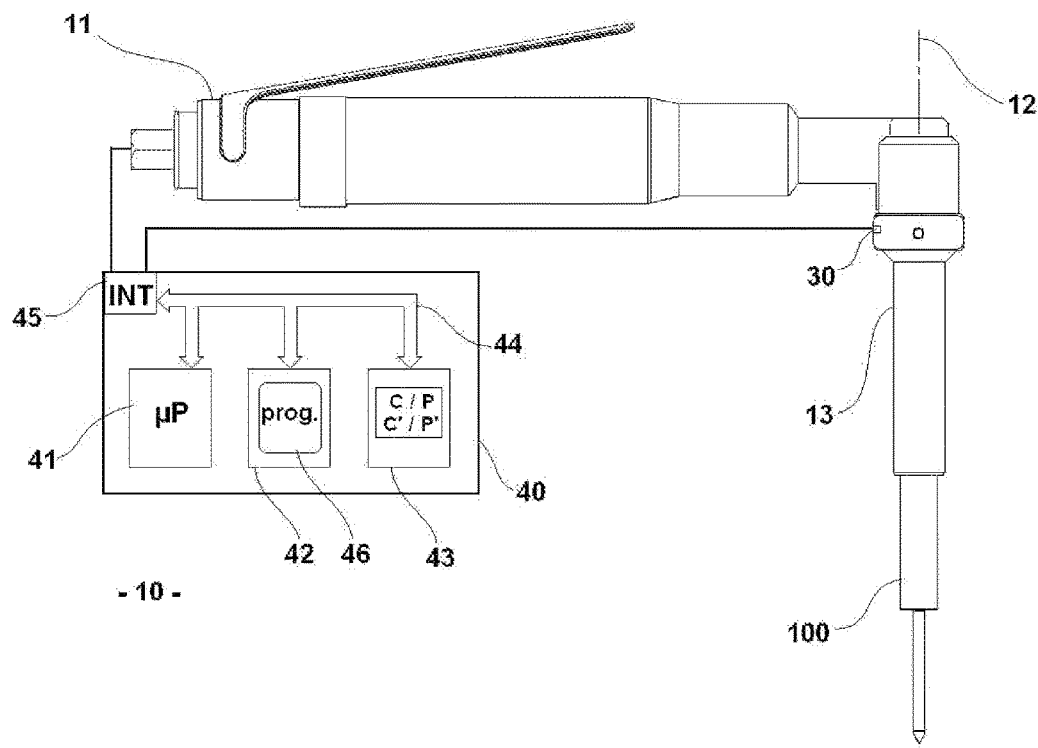

(51) Int. Cl.
*F16B 1/00* (2006.01)
*F16B 19/10* (2006.01)

(58) Field of Classification Search
USPC ............ 81/436, 438, 439, 55; 173/202, 176
See application file for complete search history.

(56) References Cited

U.S. PATENT DOCUMENTS

| | | | | |
|---|---|---|---|---|
| 2,012,708 A * | 8/1935 | Bostrom | ................. | A23L 1/275 |
| | | | | 426/250 |
| 4,867,018 A * | 9/1989 | Spector | ................. | B25B 15/007 |
| | | | | 81/439 |
| 4,982,627 A * | 1/1991 | Johnson | ................ | B23B 31/005 |
| | | | | 81/121.1 |
| 5,682,800 A * | 11/1997 | Jore | ...................... | B25B 21/007 |
| | | | | 81/429 |
| 5,724,873 A * | 3/1998 | Hillinger | ................. | B25B 23/12 |
| | | | | 81/125 |
| 5,938,212 A * | 8/1999 | Wadsworth | ........... | B23B 31/202 |
| | | | | 279/143 |
| 6,009,779 A * | 1/2000 | Mastroni | ................. | B25B 15/00 |
| | | | | 81/177.2 |
| 6,698,319 B2 * | 3/2004 | Huang | .................... | B25B 23/12 |
| | | | | 81/438 |
| 7,210,382 B2 * | 5/2007 | McCracken | ........ | B25B 23/0064 |
| | | | | 81/125 |
| 7,596,846 B2 * | 10/2009 | Hoeckelman | ......... | F16B 19/109 |
| | | | | 116/259 |
| 8,782,867 B2 * | 7/2014 | Verdier | ................. | F16B 1/0071 |
| | | | | 29/407.01 |
| 2003/0145693 A1 * | 8/2003 | Huang | .................... | B25B 23/12 |
| | | | | 81/438 |
| 2010/0224038 A1 * | 9/2010 | Evatt | ..................... | B25B 15/001 |
| | | | | 81/429 |

OTHER PUBLICATIONS

Pothmann, Johannes, French Search Report and Written Opinion, FR1254964, dated Jan. 23, 2013, 6 pages, Institut National de la Propriété Industrialle.
Pothmann, Johannes, Europe Search Report, EP13169617, dated Sep. 3, 2013, 4 pages, Europe Patent Office.

* cited by examiner

FAMILY OF TEMPORARY FASTENERS AND A DEVICE FOR INSTALLING THEM

This invention concerns insertable temporary fasteners and a device for installing them.

In the aeronautical industry, before carrying out the final assembly of metal sheets or similar elements, it is common practice to carry out a temporary assembly of the sheets using temporary fasteners inserted into through-holes.

Such temporary fasteners—for example, those described in documents GB2126146 or EP0336808—typically comprise (1) a body with a bearing face capable of coming into contact with a front face of the structures to be assembled; (2) at least one clip, intended to be passed through the drilled holes, with a hooking spur that can be applied against a rear face of the structures to be assembled; and (3) a mechanism that can be moved relative to the body and includes a threaded rod placed coaxially to the body, with one end of the rod extended by the clip, and a control nut screwed onto the other end of the rod. Via an initial movement, such a mechanism makes it possible to shift the spurs from a "closed" position to an "open" position, so that the outer diameter formed is then greater than the diameter of the through-holes. The movement then applies tension to the metal sheets between the open spurs and the body's front face.

These fasteners are generally fitted to the metal sheets using a motorized device like an electric screwdriver, equipped with an installation tool comprising
- a first cylindrical sheath that locks the body of a fastener in place once inserted. Rotating this sheath allows alternation between a position in which the fastener may be inserted or removed and a position in which the fastener is locked in place inside the installation tool,
- a second cylindrical sheath housed within the first that prevents rotation of the fastener body,
- a third cylindrical sheath housed within the second, the third being rotated by the motorized device, with one end of the third sheath rotating the control nut on the fastener.

Such an installation tool is described in document EP0466609.

When rotating, the nut moves the fastener's threaded rod, so that the hooking spurs and the body's bearing face are applied respectively to the rear and front faces of the stacked metal sheets.

Generally, the fasteners are designed to be subjected, during installation, to a set tightening torque based in particular on the diameter of the fastener. When the spurs on the clips are touching each other (closed position), the clips are designed to have a significantly circular or elliptical outer shape, of which the largest diameter is not greater than the diameter of the holes drilled in the metal sheets to be assembled. In the invention, two temporary fasteners are thus said to have different diameters when the clips form circular shapes with different diameters in the closed position.

The wrong tightening torque could have unfortunate consequences, such as degradation of the metal sheets if it is too tight or too much slack if it is too loose. Such temporary assembly faults would compromise the final assembly quality.

If the same installation device is used for two fasteners with different diameters, it is essential that the device be adjusted, as applicable, to the appropriate tightening torque.

It is common practice to equip the fasteners with identification marks or a foolproof system—using a color code, for example. Such marks allow the operator to adjust the installation device correctly according to the fastener used. However, such a system is tedious and does not rule out human error.

It is also common practice to use multiple geometrically dedicated installation devices that are identical but set to different torque values. However, such a system increases the amount of equipment required and does not rule out human error either.

The aim of this invention is to solve these problems and provide a family of temporary fasteners as described above, equipped with the means to enable an installation tool to automatically determine the appropriate tightening torque for each fastener.

In fact, one aspect of the invention concerns a family of temporary fasteners for the temporary assembly of at least two pre-drilled structures, comprising a body with a bearing face capable of coming into contact with a front face of the structures to be assembled; at least one clamp intended to be passed through the drilled holes and equipped with a hooking spur that can be applied against a rear face of the structures to be assembled; a mechanism that can be moved relative to the body, comprising a threaded rod placed coaxially to the body with one end of the rod connected to the clip, and a control nut screwed onto the rod. The family contains at least two temporary fasteners with different diameters whose control nuts have an identical outer radial dimension and a different outer axial dimension.

Depending on the fastener used, the axial dimension of the control nut can be detected by an installation device, enabling the said device to determine the appropriate tightening torque.

The different nut lengths may also be used as a visual means of distinction for the operator. Preferentially, an additional visual identifier, such as a color code, will be included on the fasteners.

Another aspect of the invention concerns a temporary fastener installation set comprising a family of fasteners as described above, as well as an installation tool comprising a first cylindrical sheath placed on an axis, with the sheath capable of interacting with the body of a temporary fastener to lock the body in place on the axis; a second cylindrical sheath housed within the first, the former being capable of interacting with the body of a temporary fastener to stop the said body rotating around the axis; a third sheath housed within the second, the former being rotatable and movable on the axis relative to the first and second sheaths, with one end of the third sheath relative to the axis equipped with the means to start rotation around the said axis via an output shaft on a motor system, and the other end of the third sheath relative to the axis capable of interacting with a control nut on the temporary fastener to rotate it. The tool also comprises a means of detecting the axial position of the third sheath relative to the first or second sheath.

The axial position of the third sheath is determined by the length of the control nut on the fastener used, with the length having been chosen based on the diameter of the temporary fastener. The installation tool thus enables identification of the diameter of the fastener used.

Preferentially, the set will also include an electric-screwdriver-type motor system, comprising an output shaft that can be connected to the first end of the third sheath on the installation tool to rotate the third sheath relative to the first; a tightening torque control box for the temporary fasteners, with a means of adjusting the device according to a tightening torque value dependent on the axial position of the third sheath relative to the first; a means of communication between the means of detecting an axial position of the third sheath relative to the first and the torque control box.

The installation tool thus sends information relating to the diameter of the temporary fastener to the control box, enabling the box to select the appropriate tightening torque. The tightening device, consisting of the installation tool and the motor system, thus automatically adjusts itself to suit the diameter of the fastener used.

The invention will be better understood when reading the following description and examining the accompanying figures. These are provided for information purposes only and are not exhaustive concerning the invention.

Figure 2:
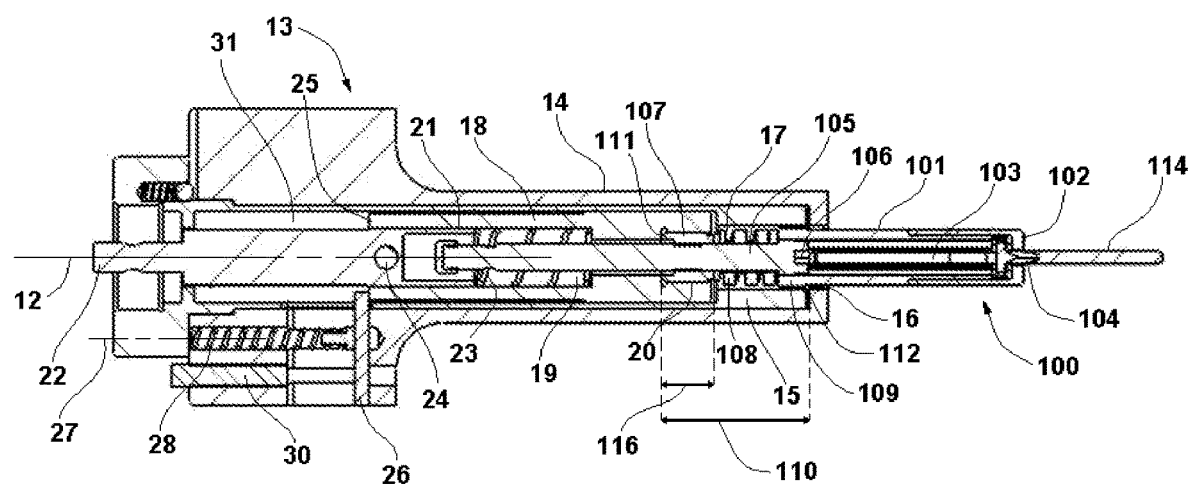

The figures illustrate the following:

FIG. 1: a temporary fastener installation set based on one method of assembling the invention FIG. 2: a partial cross-sectional view of the set shown in FIG. 1

Figure 3:
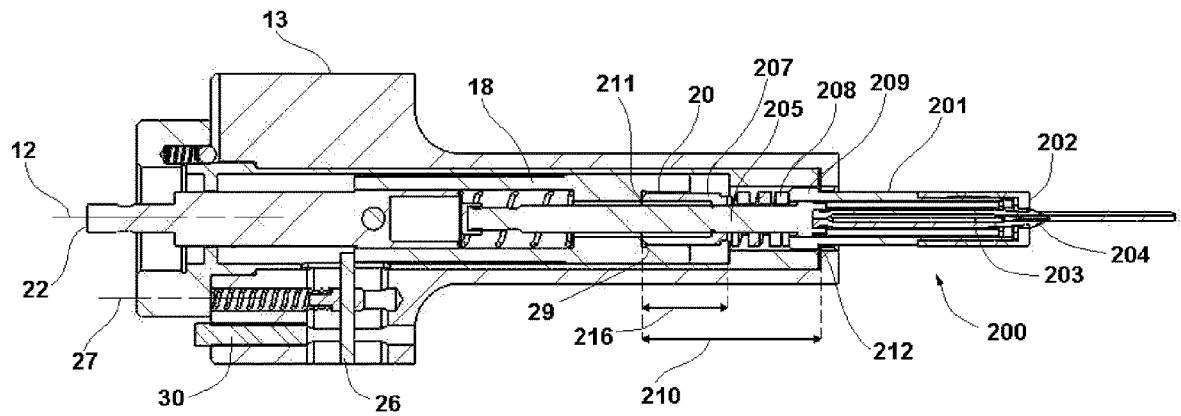

FIG. 3: another partial cross-sectional view of the set shown in FIG. 1

Figure 4:
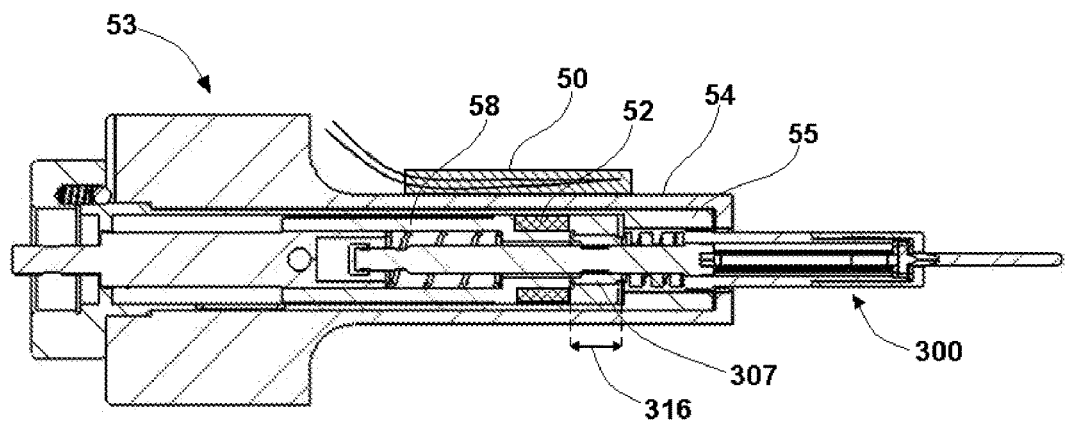
Figure 5:
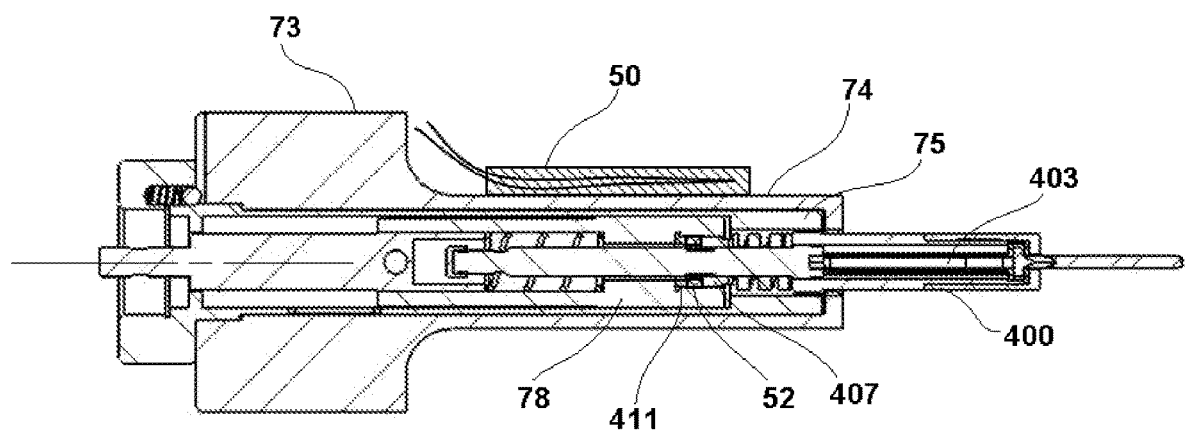

FIG. 4: a partial cross-sectional view of a temporary fastener installation set based on a second method of assembly FIG. 5: a partial cross-sectional view of the set shown in FIG. 4 based on one assembly variant FIG. 1 shows a schematic representation of a temporary fastener installation set 10 based on one method of assembling the invention.

The set 10 comprises an electric-screwdriver-type motor system 11. The system 11 comprises a motor (not shown) capable of rotating an output shaft (not shown) around an axis 12.

The system 11 is powered either by an electrical cable connected to an electrical power source, or by a battery.

The system 11 may come in different forms—commonly "straight" with the motor axis parallel to the axis 12 or "square", as shown in FIG. 1, with the motor axis perpendicular to the axis 12.

The system's 11 output shaft is connected to an insertable temporary fastener installation tool 13. The tool 13 has a significantly cylindrical shape and is placed on the axis 12.

FIG. 1 also illustrates a temporary fastener 100, in this case an insertable fastener, inserted into the tool 13 with a view to its installation. As will be described below, the fastener 100 belongs to a family of temporary fasteners that may form part of the set 10.

FIG. 2 shows a cross-sectional schematic view of the installation tool 13 and the fastener 100 inserted into the said tool.

The fastener 100 comprises a significantly cylindrical body 101 placed on the axis 12. One end of the body 101 on the said axis has a bearing face 102 capable of coming into contact with one face of the elements to be assembled, such as drilled metal sheets.

The fastener 100 also comprises two extended half-clips 103, each with a hooking spur 104 that can be applied against the other face of the metal sheets to be assembled via the lined-up holes drilled in them.

A spacer 114 in the form of a fixed structure of sheet-metal is placed between the half-clips 103. The role of the spacer is to keep the spaced spurs in the open position. When the fastener is in the closed position, the half-clips 103 extend outside the body 101 so that the hooking spurs 104 pass beyond the spacer and touch each other. In the example shown in FIG. 2, the fastener is illustrated in an open position and at the maximum tightening range, with the spacer 114 beyond the spurs.

The fastener 100 also comprises a rod 105 placed on the axis 12 that can be moved relative to the body 101. One end 106 of the rod is attached to the two half-clips 103.

A control nut 107 is screwed onto a thread on the rod. This may be a hex nut, for example. Furthermore, a compression spring 108 is placed around the rod 105 on the axis 12, between the nut 107 and one end 109 of the body 101, opposite the bearing face 102.

The installation tool 13 comprises a first cylindrical sheath 14 placed on the axis 12. The first sheath 14 forms an outer surface of the tool 13 and marks out a cavity 31 in which a second sheath 15 is placed, also on the axis 12.

Movement of the fastener body towards the bearing face 102 is prevented by the first sheath 14, which is positioned to interact with the end 109 of the body 101.

The second sheath 15 is positioned so that it interacts with the end 109 to stop the body 101 rotating around the axis 12. The end 109 has, for example, a hexagonal section near to the axial opening 16 and the second sheath 15 has an inner wall with the same shape as that section.

The second sheath 15 marks out a cavity 17 into which the end 109 of the body 101 is inserted, while the rest of the body extends outside the tool 13 via the axial opening 16.

The installation tool 13 also comprises a third cylindrical sheath 18, or sleeve, housed within the cavity 17 of the second sheath 15. The sleeve 18 can be rotated and moved inside the said cavity 17 on the axis 12.

The sleeve 18 forms an inner cavity 19, open at both ends of the sleeve 18, on the axis 12. One end 20 of the cavity 19 has the same shape as that of the nut 107 on the fastener 100. As can be seen in FIG. 2, the nut 107 thus fits into the end 20 of the cavity 19. The outer radial surface of the nut is either cylindrical or non-cylindrical, and forms, for example, a hexagon. The inner surface of the end 20 is thus able to interact with the nut 107 in order to rotate it around the axis 12. In the case of a cylindrical nut, the inner surface is equipped with a complete drive system by wedging.

The other end 21 of the cavity 19 houses a drive shaft 22 intended to be connected to the system's 11 output shaft (FIG. 1). The sleeve 18 can be moved on the axis 12 relative to the shaft 22, which is prevented from moving relative to the first sheath 14. A compression spring 23 is housed inside the end 21 of the cavity 19 between two axial end-stops formed respectively by the shaft 22 and an inner surface of the sleeve 18. The spring 23 serves to move the sleeve 18 toward the opening 16 of the sheaths 14, 15.

An axial end 25 of the sleeve 18 facing the shaft 22 has a slot positioned on a plane containing the axis 12 perpendicular to the cross-sectional drawing in FIG. 2. A pin 24, passing through the shaft 22, slides into the slot. The shaft 22 is thus able to rotate the sleeve 18 around the axis 12.

When the fastener 100 is inserted into the tool 13 with a view to installing it, the control nut 107 fits into the end 20 of the sleeve cavity 19. One axial end 111 of the nut 107 facing the drive shaft 22 comes into contact with an end-stop 29 formed by the inner wall of the end 20. Axially touching the nut 107, the sleeve 18 then adopts a certain position on the axis 12 relative to the first sheath 14. This position depends on the length 116 of the control nut 107.

The axial end 25 of the sleeve 18 facing the shaft 22 is touching a pin 26. The pin is placed perpendicularly to the axis 12. The pin 26 is able to slide into the first and second sheaths 14, 15 on an axis 27 parallel to axis 12. In the example shown in FIG. 2, the pin 26 is touching a compression spring 28 placed on axis 27. The spring 28 serves to maintain contact between the pin 26 and the end 25 of the sleeve 18.

The tool 13 is also fitted with a position sensor 30 located near to the pin 26. The sensor 30 is, for example, an electric inductive linear position sensor or another type of position sensor.

The sensor 30 is able to determine the position of the pin 26 on the axis 27. This position depends on the axial position of the sleeve 18 relative to the first sheath 14, with the axial position depending on the aforementioned length 116.

Furthermore, the system 11 comprises a tightening torque control box 40, a schematic representation of which is illustrated in FIG. 1. The box 40 comprises a microprocessor 41, a program memory 42, data storage 43, and at least one communication bus 44. The sensor 30 is connected to the box 40 via an interface 45. Information relating to the axial position of the pin 26 can then be sent to the box 40 by the sensor 30.

The box 40 memorizes a program 46, enabling adjustment of the system 11 setting to a desired tightening torque value. Furthermore, the data storage 43 includes a function to link the tightening torque C to the position P of the pin 26 on the axis 27.

When the fastener 100 is inserted into the tool 13 in the closed position, i.e. when the spring 108 is not compressed and the spurs 104 are touching each other, the length 116 of the control nut 107 determines the position P of the pin 26. The program 46 thus automatically adjusts the system 11 setting based on the length 116 by selecting the appropriate torque C. Additionally, the length 116 is controlled by locking the first sheath 14 and thus axially securing the body of the fastener 101 in place.

If the electricity supply for the system is from a battery, the torque is controlled using waves via a communication box (not shown).

FIG. 3 is a schematic representation of the tool 13 into which another temporary fastener 200 is inserted, in this case an insertable fastener. The fasteners 100, 200 in FIGS. 2 and 3 belong to the same family of temporary fasteners.

Fastener 200 is similar to fastener 100. More specifically, fastener 200 comprises a significantly cylindrical body 201 placed on the axis 12 and one end of the body has a bearing face 202. Fastener 200 also comprises two half-clips 203, each with a hooking spur 204. Fastener 200 also comprises a rod 205 placed on the axis 12 that can be moved relative to the body 201. One end of the rod is attached to the clip 203 and extended by the clip on the axis 12.

A control nut 207 is screwed onto a thread on the rod. A compression spring 208 is placed around the rod 205 between the nut 207 and one end 209 of the body 201 opposite the face 202.

The fasteners 100, 200 have different diameters, i.e. in the closed position, the respective assemblies formed by the half-clips 103, 203 are designed to have a significantly circular outer shape with different diameters.

A foolproof system is integrated into the family of fasteners to which the fasteners 100, 200 in FIGS. 2 and 3 belong. More specifically, a particular nut 107, 207 length 116, 216 is associated with each fastener 100, 200 diameter on the axis 12.

Furthermore, as the other axial lengths of the parts of the fasteners 100, 200 are essentially equal, the length 110, 210 from one end 111, 211 of the nut to an end-stop 112, 212 on the body varies for two fasteners with different diameters. In the example shown in FIGS. 2 and 3, the length 116 of nut 107 is shorter than the length 216 of nut 207. The length 110 of fastener 100 is thus shorter than the length 210 of fastener 200.

Moreover, the nuts 107, 207 have identical radial dimensions. Therefore, when the fastener 200 is inserted into the tool 13, as shown in FIG. 3, the nut 207 fits into the end 20 of the sleeve 18 cavity. The end 211 of the nut comes into contact with the end-stop 29 and moves the sleeve 18 toward the shaft 22, which varies the axial position of the sleeve in relation to the case illustrated in FIG. 2. The sleeve 18 moves the pin 26 on the axis 27. The sensor 30 thus detects a position P' of the pin that is different than the position P detected in the case illustrated in FIG. 2.

The data storage 43 in the box 40 associates a tightening torque C' to be applied to the fastener 200 with position P'. Torque C' is selected as a torque suited to the diameter of the fastener 200. Similarly, torque C, associated with pin position P in the data storage 43, is selected as a torque suited to the diameter of the fastener 100.

The program 46 thus automatically adjusts the setting of the system 11 to suit position P' of the pin 26, with the position depending on the length 210 of the fastener 200.

In the family of fasteners to which fasteners 100 and 200 belong, the different lengths 116, 216 of the nuts may be used both as a means of visual distinction for the operator and as an automatic means of configuring a fastener installation device.

An additional visual identifier, such as a colored mark according to the diameter, may also be included on an outer surface of the fasteners 100, 200.

A family of fasteners that can be installed using the tool 13 may comprise an unlimited number of fasteners with different diameters and identical radial dimensions for the ends 109, 209 of their bodies and the nuts 107, 207. Furthermore, an installation set 10 may comprise multiple tools 13 that can be adapted to the same system 11, with each tool 13 dedicated, for example, to a range of diameters and having varied body ends 109, 209 and control nut 107, 207 shapes to distinguish between the different diameter ranges.

FIG. 4 illustrates a cross-sectional schematic view of an installation tool 53 and a fastener 300 inserted into it based on another method of assembling the invention. Tool 53 differs from tool 13 in its means of detecting an axial position, but all the other parts are identical. Tool 53 can be incorporated into the set 10 shown in FIG. 1.

Fastener 300 is similar to fasteners 100, 200 and may be included in a family of fasteners incorporating said fasteners 100, 200.

In the assembly method illustrated in FIG. 4, the means of detecting an axial position comprises a magnetic sensor 50. The sensor is fitted, for example using an adhesive, to the first outer sheath 54 on the tool 53. The sensor is linked to the box 40 shown in FIG. 1 via the interface 45. Alternatively (not shown), the magnetic sensor 50 may be fitted to the second sheath 55 on the tool 53.

The means of detecting a position also comprises a magnetic ring 52 placed on the sleeve 58, for example on its outer surface. Therefore, when the fastener 300 is inserted into the tool 53, a length 316 of the control nut 307 on the fastener 300 varies the axial position of the sleeve 58 relative to its position in which no fasteners are inserted. The magnetic sensor 50 detects the position to which the sleeve 58 has been moved and sends this information to the box 40.

FIG. 5 illustrates a variant of the assembly method shown in FIG. 4. More specifically, FIG. 5 illustrates a cross-sectional schematic view of an installation tool 73 and a fastener 400 inserted into the tool. Tool 73 is similar to tool 53. In particular, tool 73 comprises a means of detecting an axial position consisting of a magnetic sensor 50 fitted to the first outer sheath 74 or, alternatively (not shown), to the second sheath 75. The difference between the tools 53, 73 is that tool 73 does not have a magnetic ring on the sleeve 78.

Fastener 400 is similar to fasteners 100, 200, 300. However, fastener 400 is significantly different than the fasteners described above, in that it has a magnetic ring 52 placed on its control nut 407.

The axial dimension of the ring 52 is the same for all the temporary fasteners belonging to the same family as fastener 400. Furthermore, the ring 52 is always placed in the same place on the nut, for example at one end 411 of the nut 407 opposite the half-clips 403 on the fastener 400.

In this family of fasteners, as in the examples described above, the axial lengths of the nuts 407 differ depending on the outer diameter of the half-clips 403.

Therefore, when the fastener 400 is inserted into the installation tool 73, the sensor 50 detects the position of the magnet on the nut 407 and sends this information to the box 40. The program 46 then selects the appropriate tightening torque based on this measurement, which depends on the outer diameter of the half-clips 403.

The invention claimed is:

1. Temporary fastener installation set comprising:
   a family of temporary fasteners for the temporary assembly of at least two pre-drilled structures, the family having,
      a body with a bearing face able to come into contact with a front face of the structures to be assembled,
      at least one clip intended to be passed through the drilled holes, with a hooking spur that can be applied against a rear face of the structures to be assembled,
      a mechanism that can be moved relative to the body, comprising a threaded rod placed coaxially to the body, with one end of the rod connected to the clip, and a control nut screwed onto the rod,
   the family comprises at least two temporary fasteners with different diameters and nuts with an identical outer radial dimension and a different outer axial dimension, and
   an installation tool comprising:
      a first cylindrical sheath placed on an axis, capable of interacting with the body of a temporary fastener to prevent the body from moving on the axis,
      a second cylindrical sheath, housed within the first cylindrical sheath, capable of interacting with the body of a temporary fastener to prevent the body from rotating around the axis,
      a third cylindrical sheath housed within the second cylindrical sheath, that can be rotated and moved on the axis relative to the first sheath,
         with a first end of the third sheath relative to the axis equipped with means for rotating the third cylindrical sheath around the axis via the output shaft of a motor system, and
         a second end of the third sheath relative to the axis capable of interacting with the control nut on the temporary fastener in order to rotate it,
      a means for detecting the axial position of the third sheath relative to the first sheath.

2. The set according to claim 1, with each fastener including an additional visual identifier associated with the diameter of the fastener.

3. The set according to claim 1 or 2, with each fastener including a magnetic ring placed on the control nut.

4. Set according to claim 1, where the means for detecting the axial position of the third sheath comprises a position sensor and a pin placed inside the first and second cylindrical sheaths touching one end of the third cylindrical sheath, which is capable of sliding into the first and second cylindrical sheaths.

5. Set according to claim 1, where the means for detecting the axial position of the third sheath comprises a magnetic position sensor placed on the first or second cylindrical sheath and a magnetic ring placed on the third cylindrical sheath.

6. Set according to claim 1, comprising a family of fasteners with each fastener including a magnetic ring placed on the control nut and where the means for detecting the axial position of the third sheath comprises a magnetic position sensor placed on the first or second cylindrical sheath capable of detecting the position of the magnetic ring placed on the control nut.

7. Set according to claim 1, also comprising an electric-screwdriver-type motor system consisting of:
   an output shaft that can be connected to the first end of the third sheath on the installation tool in order to rotate the said third sheath relative to the first,
   a tightening torque (C, C') control box for the temporary fasteners configured to receive data representing an axial position (P, P') of the second sheath in relation to the first sheath,
   a means for communication between the means for detecting the axial position of the third sheath in relation to the first sheath and the torque control box.

8. Set according to claim 7, where the installation tool comprises a drive shaft capable of connecting an output shaft from the motor system to the third sheath, with the third sheath connected to the drive shaft while rotating and movable relative to the drive shaft.

9. Set according to claim 7, where the system is connected to an electrical power source using a wire.

10. Set according to claim 7, where the system is electrically powered by a battery.

* * * * *